US006136494A

United States Patent [19]

[11] Patent Number: 6,136,494

[45] Date of Patent: *Oct. 24, 2000

Teramoto et al.

[54] TRANSFER SHEET

[75] Inventors: Yoshikichi Teramoto; Tooru Misawa; Satoru Matsunaga, all of Niihari-gun, Japan

[73] Assignee: Kureha Kagaku Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/750,737

[22] PCT Filed: Apr. 19, 1996

[86] PCT No.: PCT/JP96/01075

§ 371 Date: Mar. 6, 1997

§ 102(e) Date: Mar. 6, 1997

[87] PCT Pub. No.: WO96/33447

PCT Pub. Date: Oct. 24, 1996

[30] Foreign Application Priority Data

| | | | |
|---|---|---|---|
| Apr. 21, 1995 | [JP] | Japan | 7-120939 |
| Oct. 31, 1995 | [JP] | Japan | 7-306659 |

[51] Int. Cl.[7] .......................... C08L 69/00; C08G 64/10; G03G 7/00

[52] U.S. Cl. .......................... 430/126; 430/47; 428/220; 525/470; 399/297

[58] Field of Search .......................... 428/220; 525/470; 430/47, 126; 399/297

[56] References Cited

U.S. PATENT DOCUMENTS

| | | | |
|---|---|---|---|
| 3,334,154 | 8/1967 | Kim | 525/470 |
| 4,140,730 | 2/1979 | Binsack | 525/470 |
| 4,352,847 | 10/1982 | Okiyama | 428/141 |
| 5,601,913 | 2/1997 | Ohtani | 428/220 |
| 5,612,163 | 3/1997 | Teramoto | 525/470 |

FOREIGN PATENT DOCUMENTS

| | | |
|---|---|---|
| 0 424 800 A2 | 10/1990 | European Pat. Off. . |
| 0 650 096 A2 | 10/1994 | European Pat. Off. . |

*Primary Examiner*—David J. Buttner
*Attorney, Agent, or Firm*—Dike, Bronstein, Roberts & Cushman, LLP; David G. Conlin; Cara Z. Lowen

[57] ABSTRACT

A transfer sheet comprising not less that 75% by mass of a polycarbonate resin, and having a ratio of an infrared absorbency at a wave-number of 155 $mm^{-1}$ to that at a wave-number of 160 $mm^{-1}$ of not less than 0.02 and less than 0.3, a melting viscosity of not less than 2,500 Pa·s when measured at 280° C. by a Koka-type flow tester and thickness of 130 to 250 μm. The transfer sheet can satisfy requirements of a mechanical durability, flame retardant properties and a modability simultaneously.

3 Claims, No Drawings

TRANSFER SHEET

FIELD OF THE INVENTION

The present invention relates to a transfer sheet, and more particularly, to a transfer sheet for a printing medium for use in electrophotographic copying machines, printers or the like.

BACKGROUND ART

In general, transfer sheets are composed of a synthetic resin sheet and have a transferring function for causing images formed on a photosensitive drum to be transferred thereonto. In some cases, the transfer sheets also have a transporting function for causing the images carried on the photosensitive drum to be transported to copying papers and a separating function for causing the copying papers on which the images have already been transferred, to be separated therefrom. The transfer sheets are generally used in the form of a drum or a belt, and always under go a mechanical load during the use. For this reason, it is required that the transfer sheets exhibit a high strength against repeated loading, i.e., a high fatigue strength in addition to a so-called mechanical strength and elongation.

It has been strictly required that the afore-mentioned mechanical durability of the transfer sheets is so high as to withstand several ten thousands of copying operations. The mechanical durability of the transfer sheets varies depending upon structure or configuration of the copying machines or printers in which the transfer sheets are used, and therefore is evaluated by the below-mentioned testing methods. The transfer sheets are required, if possible, to exhibit a mechanical durability capable of withstanding not less than a hundred thousand copying operations when evaluated by such testing methods. However, it has been considered by a person skilled in the art that the afore-mentioned high mechanical durability of the transfer sheets is extremely difficult to realize by using an existing moldable synthetic resin sheet.

Further, since the transfer sheets are used as an electrical part to which a high voltage is applied, it is inevitably required that they have flame-retardant properties. The flame-retardant properties required for the transfer sheets are as high as not less than VTM-2 according to Underwriters Laboratories (UL) Standard No. 94 (Underwriters Laboratories Inc.). However, the increase in flame-retardant properties of a resin material causes the deterioration in its mechanical strength, while the increase in the mechanical strength causes the deterioration in the moldability and the flame-retardant properties. Therefore, it is extremely difficult to satisfy these properties simultaneously.

The present invention has been accomplished in view of the afore-mentioned problems. It is an object of the present invention to provide a transfer sheet which satisfies a high mechanical durability, high flame-retardant properties and a high moldability, simultaneously.

DISCLOSURE OF THE INVENTION

That is, an aspect of the present invention lies in a transfer sheet comprising not less than 75% by mass of a polycarbonate-based resin, and has a ratio of an infrared absorbency at a wave-number of 155 $mm^{-1}$ to that at 160 $mm^{-1}$ of not less than 0.02 and less than 0.3, a melting viscosity of not less than 2,500 Pa·s when measured at 280° C. by a Koka-type flow tester and a thickness of 130 to 250 μm.

The present invention is described in detail below. Incidentally, in the following description, the polycarbonate resin is referred to merely as "PC resin".

The transfer sheet according to the present invention may be produced by using a PC resin or a PC resin-containing composition as a raw material and generally extruding the material into an appropriate shape. The content of the PC resin in the PC resin-containing composition may be not less than 75% by mass. Other resin components than the PC resin in the PC resin-containing composition cab be optionally selected unless the addition thereof adversely influences the effects of the present invention. For example, as other resin components in order to reduce an electrical resistance of the resultant composition, graft copolymers comprising a rubber backbone polymer and a grafted polymer comprising at least one of alkyl acrylate and alkyl methacrylate as repeating units.

At least one of the PC resin and the other resin components in the composition is required to be brominated. In the case where the PC resin is brominated, the bromine atoms may be introduced thereto to produce, for example, a structure of tetrabromobisphenol A. That is, as the brominated PC resins, copolymers having structural units represented by the following general formula (I) can be preferably used:

(I)

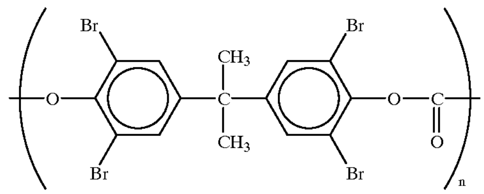

The afore-mentioned copolymers may be produced by the condensation of phosgene, bisphenol A and tetrabrombisphenol A. At this time, the resulting copolymers may be of any optional polymeric configuration, e.g., random copolymers, block copolymers, alternating copolymers, graft copolymers or the like.

It is preferred that transfer sheet according to the present invention be composed substantially of the PC resin alone. In this case, the PC resins are not limited to the brominated PC resins.

The transfer sheets according to the present invention has a ratio of an infrared absorbency at a wave-number of 155 $mm^{-1}$ to that at 160 $mm^{-1}$ [$D(155\ mm^{-1})/D(160\ mm^{-1})$] of not less than 0.02 and less than 0.3. The afore-mentioned infrared absorbency ratio is a value measured by an infrared-transmitting method. Specifically, the measured values can be obtained by subjecting a sheet having a thickness of 80 μm, which is produced by press-molding a powder of the PC resin or the PC resin-containing composition at 260° C., to exposure to the infrared rays having the afore-mentioned wave-numbers or those close thereto. The measuring equipment usable for the measurement, include, for example, an infrared spectrophotometer "FTIR-1710" manufactured by Perkin-Elmer Corp.

The infrared absorption at wave-number of 160 $mm^{-1}$ or close thereto is caused depending upon in-plane vibration of carbon-to-carbon bonds of the benzene ring. Whereas, it is considered that the infrared absorption at 155 $mm^{-1}$ or close thereto results from the shift of the absorption at 160 $mm^{-1}$ caused due to chemical bonds between carbon atoms of the benzene ring and bromine atoms.

The afore-mentioned absorbency ratio may be used as an index for representing a bromine content in the PC resin or the PC resin-containing composition. When the absorbency ratio is less than 0.02, the transfer sheet exhibits insufficient flame retardant properties. On the other hand, when the absorbency ratio is not less than 0.3, the mechanical durability of the transfer sheet is deteriorated. The preferable lower limit of the absorbency ratio is 0.03, more preferably 0.06, and the preferable upper limit thereof is 0.25.

The sheet material containing the tetrabromobisphenol A represented by the above-mentioned general formula (I) is an amount of about 1 to about 15 mol %, preferably about 2 to about 15 mol %, more preferably about 3 to about 10 mol %, can satisfy the afore-mentioned requirements for the absorbency ratio. Such a sheet material is disclosed in detail in the U.S. Pat. No. 3,855,277, the disclosures of which are incorporated herein by reference.

The transfer sheet according to the present invention has a melting viscosity of not less than 2,500 Pa·s, preferably not less than 2,700 Pa·s, more preferably not less than 2,900 Pa·s, when measured at 280° C. by means of a Koka-type flow meter. Specifically, the afore-mentioned melting viscosity can be measured under a load of 156.8 N (=160 kgf) by using a die provided with a bore having a diameter of 1 mm and a length of 10 mm.

When the afore-mentioned melting viscosity is less than 2,500 Pa·s, the mechanical durability of the transfer sheet is deteriorated. The upper limit of the afore-mentioned melting viscosity is not particularly restricted, but since the melting viscosity of more than 4,000 Pa·s causes a deteriorated moldability and therefore, a difficulty in being extruded into sheets, the melting viscosity is usually not more than 4,000 Pa·s, preferably 3,500 Pa·s.

The thickness of the transfer sheet according to the present invention is in the range of 130 to 250 μm, preferably 135 to 200 μm, more preferably 140 to 170 μm. When the thickness of the transfer sheet is less than 130 μm, the transfer sheet cannot exhibit sufficient flame retardant properties. On the other hand, when the thickness is more than 250 μm, the rigidity of the transfer sheet becomes too high, so that it is difficult to bend the transfer sheet when assembled to the machine or used.

The transfer sheet according to the present invention may contain conventional additives. Examples of such additives include inorganic compounds such as calcium sulfate, silica, asbestos, talc, clay, mica, quartz powder, etc.; anti-oxidants such as hindered phenol-based anti-oxidants, phosphorus-based anti-oxidants (phosphite-based anti-oxidants, phosphate-based anti-oxidants) or amine-based UV absorbers or benzophenone-based UV absorbers; external lubricants such as aliphatic carboxylate-based external lubricants or paraffin-based external lubricants; antistatic agents; or the like.

BEST MODE FOR CARRYING OUT THE INVENTION

Next, the present invention is described in detail below by way of examples. Incidentally, in the following examples, the physical properties have been evaluated by the below-mentioned methods.

(1) Mechanical Durability:

A strip-like cut sheet having a width of 10 mm and a length of 110 mm was reciprocated on a freely-rotatable roll having a diameter of 20 mm, while applying a load of 29.4 N to longitudinal opposite ends thereof. The number of passages over the roll until causing breakage of the sheet were measured. The number of passages over the roll are equal to twice reciprocating cycles of the sheet. Incidentally, the sheet exhibited a vibrational amplitude of 25 mm and was moved at a rate of 140 reciprocating cycles per minute. The reciprocating cycle rate was found to be identical to an average velocity of 7 m/min. This evaluation method corresponds to an acceleration test of a fatigue-breaking test ordinarily used in this field. Five test specimens were used in each measurement and an average value thereof was regarded as the test result.

(2) Flame-retardant Properties:

The flame-retardant properties were measured in terms of a VTM level According to UL Standard No. 94.

EXAMPLES 1 TO 4 AND COMPARATIVE EXAMPLES 1 TO 4

The following PC resin (1) to (4) were used as raw materials.

(1) Brominated PC resin containing structural units represented by the afore-mentioned General Formula (I): "NOVALEX 7030NB" produced by Mitsubishi Chemical Corp.

The PC resin had a melting viscosity of 2,650 Pa·s when measured at 280° C. by a Koka-type flow tester, and a infrared absorbency ratio [D(155 $mm^{-1}$)/D(160 $mm^{-1}$)] of 0.31.

(2) Non-brominated PC resin (1): "TOUGHRON A2500" produced by Idemitsu Petrochemical Industries Co, Ltd.

The said melting viscosity of the resin was 1,170 Pa·s.

(3) Non-brominated PC resin (2): "TOUGHRON A3000" produced by Idemitsu Petrochemical Industries Co, Ltd.

The said melting viscosity of the resin was 3,260 Pa·s.

(4) Non-brominated PC resin (3): "NOVALEX 7030U" produced by Mitsubishi Chemical Corp.

The said melting viscosity of the resin was 3,220 Pa·s.

The afore-mentioned raw resins were blended at composition ratios shown in Table 1 and the blended resins were pelletized by a twin-screw extruder. The thus-obtained pellets were dried at 120° C. for 6 hours and thereafter, molded into a transfer sheet having a thickness of 150 μm by a single-screw extruder equipped with a T-die. The physical properties of the thus-obtained transfer sheet are shown in Table 1. The absorbency ratios shown in Table 1 were values measured with respect to the test specimens each having a thickness of 80 μm.

TABLE 1

| | Kind of Non-brominated PC resin | Composition ratio (% by mass) Non-brominated PC resin | brominated PC resin | Absorbency ratio | Melting viscosity Pa · s | Flame retardant property VTM | Number of passages over roll ($\times 10^3$) |
|---|---|---|---|---|---|---|---|
| Example 1 | A3000 | 77 | 23 | 0.06 | 3040 | 2 | 160 |
| Example 2 | 7030U | 23 | 77 | 0.24 | 2660 | 1 | 140 |
| Example 3 | 7030U | 77 | 23 | 0.06 | 2920 | 2 | 230 |
| Example 4 | A3000 | 83 | 17 | 0.03 | 3150 | 2 | 150 |
| Comparative Example 1 | 7030U | 100 | 0 | 0 | 3220 | No Good | 430 |

TABLE 1-continued

| | Kind of Non-brominated PC resin | Composition ratio (% by mass) Non-brominated PC resin | brominated PC resin | Absorbency ratio | Melting viscosity Pa · s | Flame retardant property VTM | Number of passages over roll ($\times 10^3$) |
|---|---|---|---|---|---|---|---|
| Comparative Example 2 | A2500 | 23 | 77 | 0.23 | 1980 | 1 | 81 |
| Comparative Example 3 | 7030U | 91 | 9 | 0.01 | 3100 | No Good | 310 |
| Comparative Example 4 | — | 0 | 100 | 0.31 | 2650 | 0 | 86 |

As described above, in accordance with the present invention, there is provided a transfer sheet capable of transferring images onto more than a hundred thousand printing media, which shows an excellent strength to a fatigue failure, high flame-retardant properties of more than VTM-2 according to UL Standard No. 94 and an excellent transparency, and is readily replaceable with new ones.

What is claimed is:

1. A method of transferring an image of an electrophotographic copying machine or printer, comprising:

transferring an image to a transfer sheet of the electrophotographic copying machine or printer, the transfer sheet consisting of a brominated polycarbonate-based resin or a mixture of a brominated polycarbonate-based resin and a polycarbonate-based resin, and the transfer sheet having a ratio of an infrared absorbance at a wave-number of 155 $mm^{-1}$ to that at a wave-number of 160 $mm^{-1}$ of not less than 0.02 and less than 0.3, a melting viscosity of not less than 2,500 Pa·s when measured at 280° C. by a Koka-type flow tester, and a thickness of 130 to 250 $\mu$m.

2. An electrophotographic copying machine comprising a transfer sheet for printing media of an electrophotographic copying machine, the transfer sheet consisting of a brominated polycarbonate-based resin or a mixture of a brominated polycarbonate-based resin and a polycarbonate-based resin, and the transfer sheet having a ratio of an infrared absorbance at a wave-number of 155 $mm^{-1}$ to that at a wave-number of 160 $mm^{-1}$ of not less than 0.02 and less than 0.3, a melting viscosity of not less than 2,500 Pa·s when measured at 280° C. by a Koka-type flow tester, and a thickness of 130 to 250 $\mu$m.

3. A printer comprising a transfer sheet for printing media of an electrophotographic copying machine, the transfer sheet consisting of a brominated polycarbonate-based resin or a mixture of a brominated polycarbonate-based resin and a polycarbonate-based resin, and the transfer sheet having a ratio of an infrared absorbance at a wave-number of 155 $mm^{-1}$ to that at a wave-number of 160 $mm^{-1}$ of not less than 0.02 and less than 0.3, a melting viscosity of not less than 2,500 Pa·s when measured at 280° C. by a Koka-type flow tester, and a thickness of 130 to 250 $\mu$m.

* * * * *